Aug. 18, 1936. C. H. SCOTT Re. 20,072

SEDIMENTATION APPARATUS

Original Filed Feb. 23, 1932 4 Sheets-Sheet 1

INVENTOR
CHARLES H. SCOTT
BY Arthur Nicholson
ATTORNEY

Aug. 18, 1936. C. H. SCOTT Re. 20,072

SEDIMENTATION APPARATUS

Original Filed Feb. 23, 1932 4 Sheets-Sheet 2

INVENTOR
CHARLES H. SCOTT
BY Arthur Middleton
ATTORNEY

Aug. 18, 1936. C. H. SCOTT Re. 20,072

SEDIMENTATION APPARATUS

Original Filed Feb. 23, 1932 4 Sheets-Sheet 3

INVENTOR
CHARLES H. SCOTT
BY Arthur Middleton
ATTORNEY

Aug. 18, 1936. C. H. SCOTT Re. 20,072

SEDIMENTATION APPARATUS

Original Filed Feb. 23, 1932 4 Sheets-Sheet 4

INVENTOR
CHARLES H. SCOTT
BY Arthur Nisselson
ATTORNEY

Reissued Aug. 18, 1936 Re. 20,072

UNITED STATES PATENT OFFICE 20,072

SEDIMENTATION APPARATUS

Charles H. Scott, Ozone Park, N. Y., assignor to The Dorr Company, Inc., New York, N. Y., a corporation of Delaware Original No. 1,888,743, dated November 22, 1932, Serial No. 594,441, February 23, 1932. Application for reissue October 21, 1933, Serial No. 694,649

7 Claims. (Cl. 210—55)

This invention relates to sedimentation apparatus of the type of thickeners or clarifiers in which solids suspended in liquids are settled to the bottom of the clarifier by sedimentation wherein the settled solids in the form of sludge are raked to a central sludge discharge. The rakes depend from more or less radially extending rake arms which are propelled from a rotatable vertical support. More particularly, the invention relates to the arrangement of the vertical rotatable support mechanism and the means for rotating said support.

The object of the invention is to devise an arrangement for operating the sludge discharge rakes in a manner which avoids the necessity of any overhead supporting truss or bridge which has been considered necessary heretofore in clarifiers of this type. That is, one object of the invention is to make the clarifier more sightly. Another object is to so simplify the sludge discharge drive mechanism, that the cost of its construction will be reduced.

To that end the invention includes among other things the provision of a center shaft, pier or column upstanding from the bottom of the clarifier which is used to form the support for a rotatable sleeve or drum which carries the sludge discharge rake mechanism. At the same time, the pier is used as a support for the motor devices for driving the rotatable drum and its sludge raking mechanism. This is accomplished by providing on the pier a platform or framework from which the rotatable drum can depend and from which the motor devices and gearing can be mounted. Also the invention includes making the center pier hollow and using it as a part of a siphonic central feed to the clarifier. Thus, the center pier is caused to serve a number of useful purposes.

Figure 1:
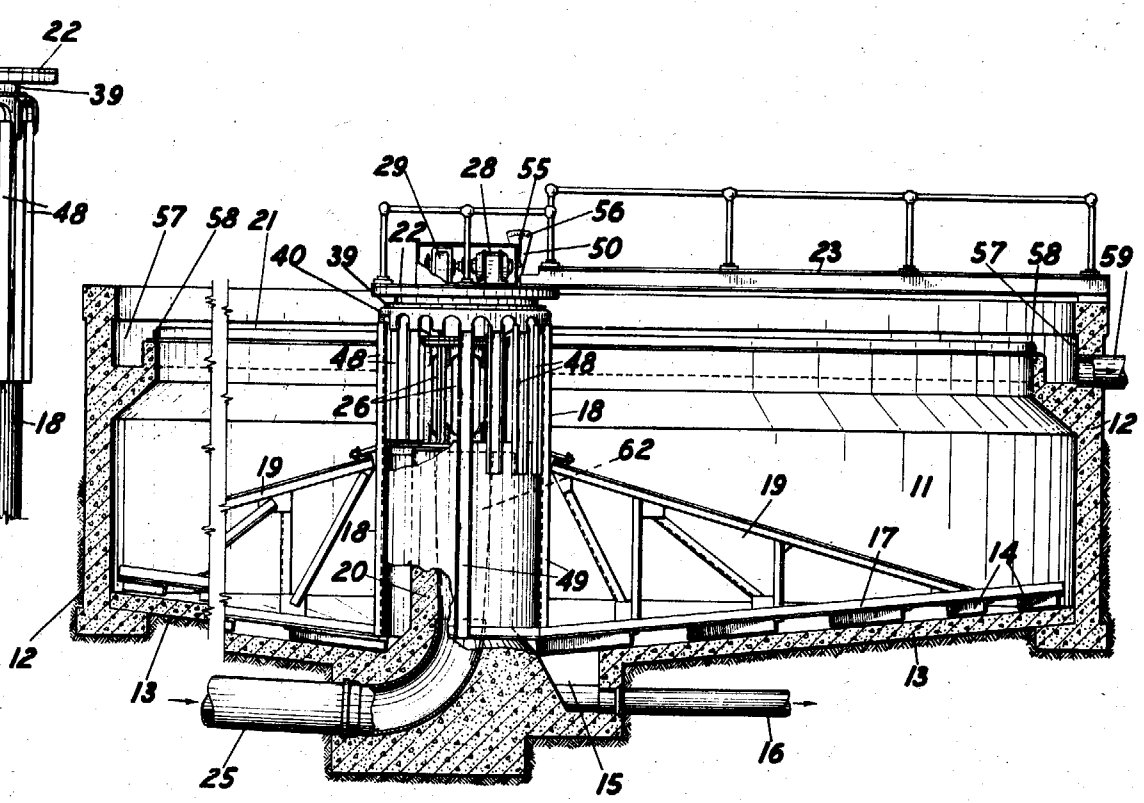
Figure 5:
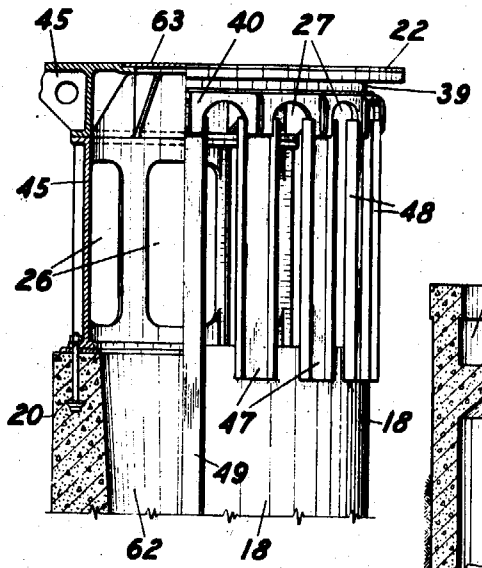
Figure 2:
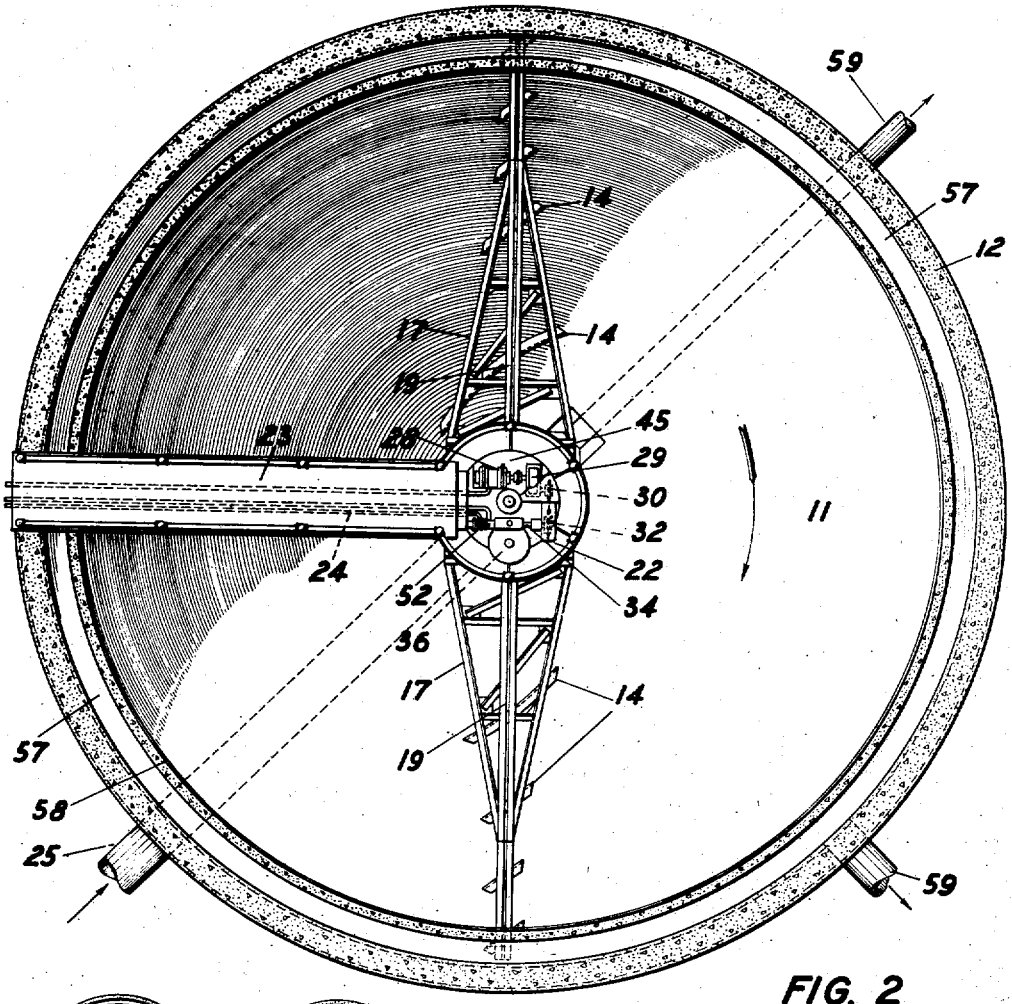
Figure 6:
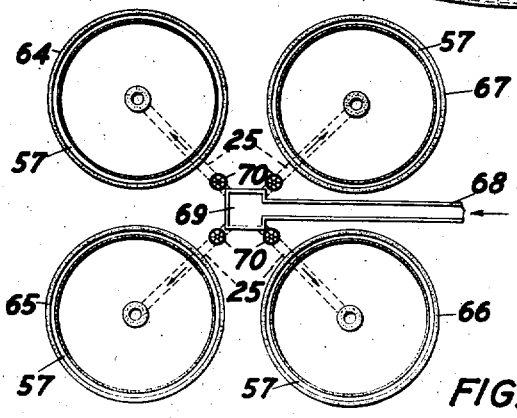
Figure 3:
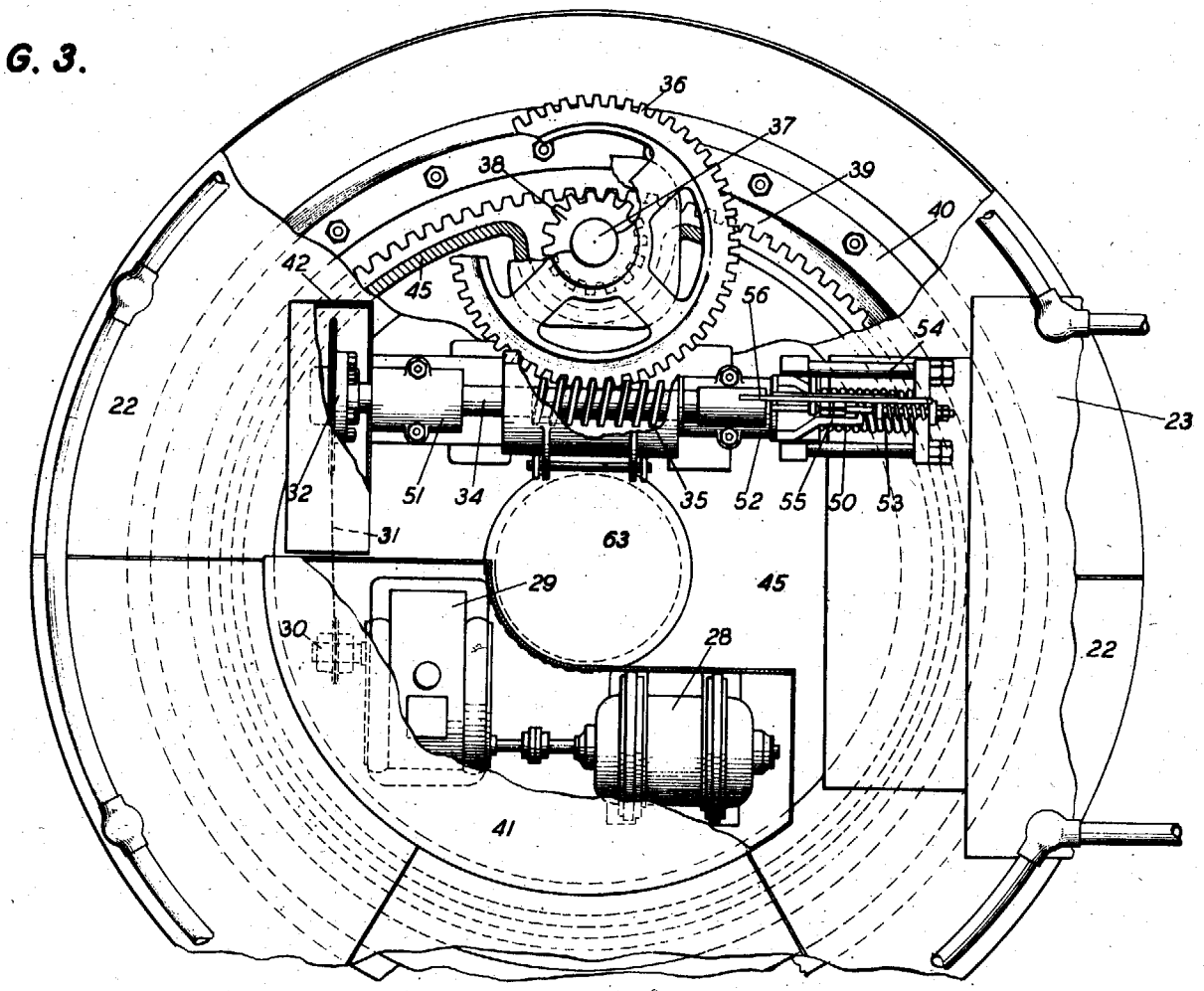
Figure 4:
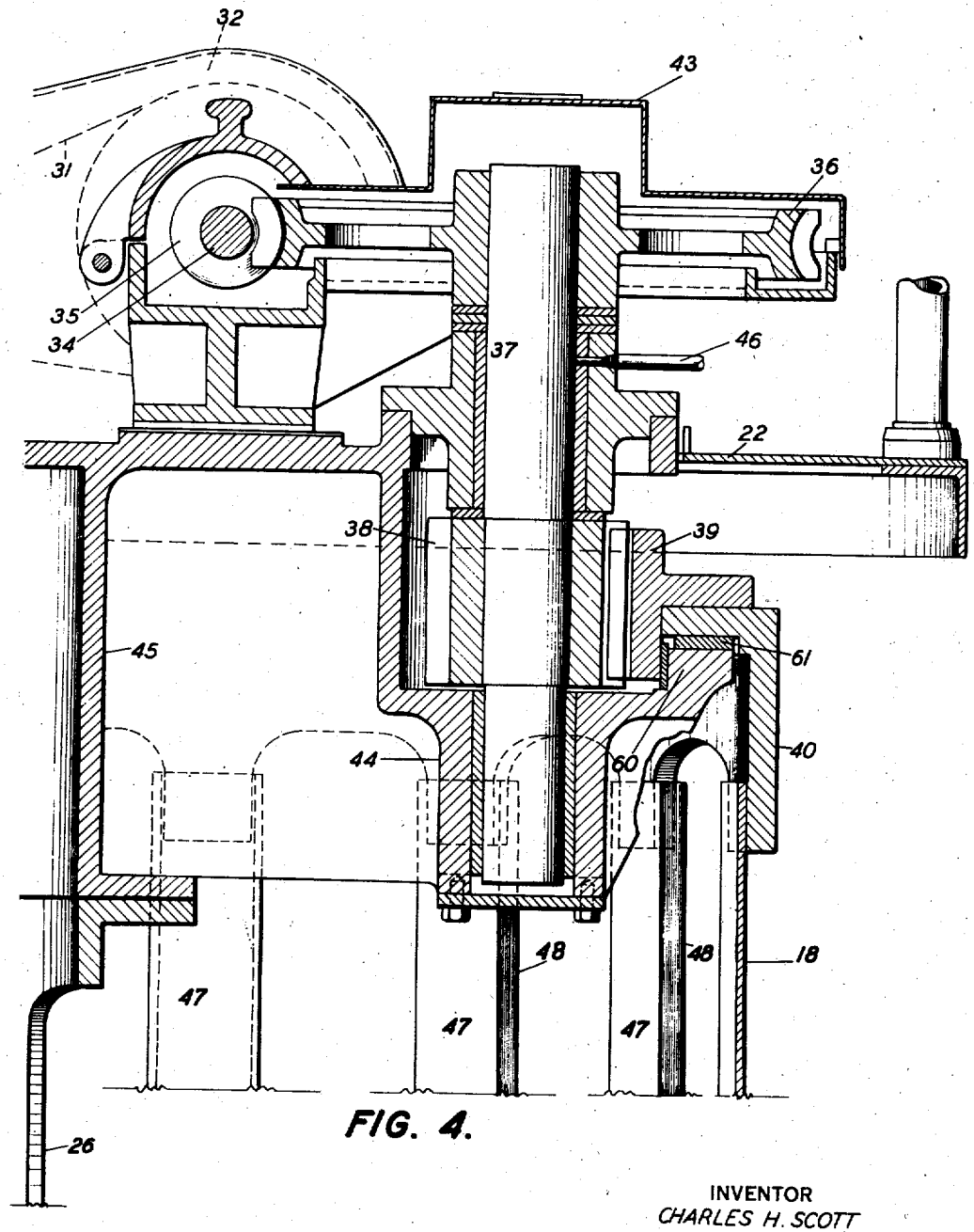

I have illustrated in the accompanying drawings one embodiment of the invention which is the best of which I am at present informed. In these drawings, Figure 1 is an elevational view, with parts in section and with parts broken away, of a clarifier showing the invention as applied thereto; Figure 2 is a plan view of a clarifier with my improved sludge discharge driving mechanism; Figure 3 is a plan view, with parts in section of the platform from which the rotatable drum depends and on which the motor devices are located; Figure 4 is a vertical sectional view of a detail of the gearing mechanism for the drum in the manner of the drum support; Figure 5 is a partial sectional view with parts broken away showing the feed distributing slots; while Figure 6 is a diagrammatic showing of siphonically feeding a plurality of adjacent clarifiers.

In sedimentation devices such as clarifiers, thickeners or sewage digesters, it is customary to have a tank 11 for holding the liquid from which solids in suspension are to be removed, provided with a side wall 12 and a bottom 13. Solids settling to the bottom 13 by sedimentation take the form of sludge which is raked or impelled by slowly moving rake blades 14 toward a bottom sludge discharge hopper 15 from which the sludge is removed through a discharge pipe 16.

The rake blades 14 are usually supported or depend from rake arms 17 which extend more or less radially from a central vertical rotatable support 18 and the rake arm 17 may be braced by tension rods or braces 19. This rotatable support 18 is sometimes referred to as a rotatably supported carrying means and may be viewed as depending from the rotatable turntable structure or driven ring 40. The rotatable support 18 may also be viewed as a pier encircling cage broadly functioning as a member by and through the medium of which settled solids raking elements are supported from the rotatable turntable 40 and are caused to turn as and when the turntable 40 turns.

In the present invention, the vertical support 18 is in the form of a drum, shell, sleeve, structural frame, or cage which encircles a central column pier or shaft 20 upstanding from the bottom 13 of the clarifier tank. The center pier 20 extends upwardly above the normal liquid level 21 in the clarifier and is provided with a platform 22 supported from a stationary framework or structure 45 forming substantially an extension of the pier. To this platform or framework extends a bridge 23 from the periphery or wall 12 of the clarifier to provide a walkway for the operator to the platform 22 to inspect the mechanism mounted thereon. The bridge or walkway 23 may be used to house the necessary electric wiring 24 to convey power to the operating mechanism and it may or may not also be used to support a feed launder for the incoming liquid to be treated in the clarifier.

The feed under some circumstances may be brought in by a radial feed launder so that it is fed to the clarifier centrally thereof, or under other circumstances the feed to the clarifier may be arranged peripherally of the clarifier. However, my preferred form of feed is by means of an inverted siphon 25 extending upwardly through the pier 20, which in this case is hollow, from which the feed is discharged into the clarifier at substantially the liquid level thereof through slotted openings 26 in the pier and similar openings 27 in the drum 18.

This invention relates to the support of the drum 18 in a depending manner from the framework 45 and the mounting on that framework of mechanisms for driving the drum 18 which includes a stationary motor 28 and a speed reducer 29. The speed reducer operates through suitable means such as a pulley or sprocket 30; belt or chain 31; and pulley or sprocket 32; and a shaft 34 suitably supported on the framework 45 which is provided with a worm gear 35 meshing with a horizontal gear 36 carried by vertical shaft 37. This shaft has keyed to it a gear 38 meshing with a bull or ring gear 39, from which is dependingly supported the drum 18, which is preferably secured to the gear 39 by means of a flanged turntable or ring 40. The motor 28 and speed reducer 29 may be suitably housed by casing 41, and the pulley 32 may also be housed by casing 42. A further casing 43 may protect the horizontal gear 36 while the shaft 37 may be suitably housed and journaled at 44.

The turn-table 40, carrying the drum 18, is supported from the framework or turntable base 45 (which also includes journal 44 and flange 60) secured in position on the pier 20 in any suitable manner. The base 45 also supports the platform 22. The shaft may have lubricating connections such as at 46. The drum 18 may be suspended from the turntable 40 by means of channel-irons 47 spaced apart to form the slotted openings 27. These channel-irons have flanges 48. One or more of the channel-irons may be extended as at 49 to reenforce the drum 18 against thrust thereon exerted by the sludge raking mechanism.

Under certain circumstances, it is desirable to indicate any abnormal load which may come on the sludge discharge mechanism so for that purpose there is applied at the end of the shaft 34 an overload alarm device 50. This is arranged by having the shaft 34 mounted for slight longitudinal movement in its bearings 51 and 52, but a spring 53 is provided in a supporting frame 54 which normally tends to prevent longitudinal displacement of the shaft 34. If an abnormal load comes on the drive mechanism, the shaft 34 will be displaced longitudinally against the pressure of the spring 53 and this displacement of the shaft operates a pivoted pointer 55 which shows on a scale 56 that the pointer has passed the position of normal operation. The pointer may also be used to operate a visible or audible signal to the operator, that abnormal conditions exist.

Liquid from which suspended solids have been settled overflows into a peripheral outlet 57 after first getting past a baffle or weir 58 and then flows from the effluent launder 57 through the outlet pipe 59. 60 indicates a bracket arrangement forming part of the turntable base or framework 45, which supports the turntable 40 from which the drum 18 depends with anti-friction devices 61 interposed between the bracket and the turn-table. The turn-table base 45 is annular in configuration and has a central opening with a separate cover plate 63 over the central opening.

The conveying of the feed to the clarifier or thickener by siphoning it upwardly through the central pier has many advantages. The manner in which it is carried out is to provide the central pier 20 with a hollow portion 62 forming one leg of a siphon 25, and connecting to the hollow portion the remaining portion of the siphon 25. The siphon is of course fed from a source of supply of the liquid to be treated in a clarifier located higher than the liquid level in the clarifier. The liquid from the leg 62 of the siphon within the pier 20 exits therefrom through slotted openings 26 in the pier. The slotted openings 27 in the drum 18 are alignable with the openings 26 to enable the feeding material to pass through the revoluble drum 18 to be treated in the clarifier.

Where several clarifiers are to be used, they can be arranged as diagrammatically shown in Fig. 6 wherein 64, 65, 66 and 67 represent clarifiers, each provided with a hollow central pier 20. 68 indicates the channel containing liquid to be treated in the clarifiers leading to a disturbing basin 69 from which a siphonic feed 25 leads to each clarifier. A valve or other flow controlling device 70 is provided for each siphonic feed whereby feed from the basin 69 can be selectively supplied to any or all of the clarifiers. As the liquid level in the basin 69 is maintained above the liquid level in the clarifiers, it furnishes sufficient hydrostatic head to siphon the feed from the basin into the clarifiers.

*Operation*

The liquid with its solids in suspension to be clarified or thickened by sedimentation is flowed into the sedimentation tank 11 in a continuous manner and the clarified liquid is flowed therefrom as effluent in a continuous manner. Solids settling out of the liquid fall to the bottom of the clarifier in the form of sludge and are collected by blades 14 which are moved by means of the rake arms 17 which are rotated by the central vertical element 18. So much of the invention is customary.

The invention is embodied in the arrangement wherein the frame or extension work 45 on the central pier 20 serves a dual purpose of forming a support for the rotatable drum 18 equipped with sludge discharge rakes and the motor drive mechanism for revolving the drum. The motor, speed reducer and gearing are all preferably mounted on the turn-table base or framework supported on the central pier. The drum 18 depends from a turn-table 40 deriving its support from the bracket arrangement 60 forming a part of the turntable base 45 and is preferably supported on an anti-friction device 61. The turn-tables 40 from which the drum 18 depends is provided with a bull ring or gear 39 which is driven by means of suitable gearing from the motor 28.

Operation of the motor 28, through the speed reducer 29, shaft 34 and worm gear 35, causes gear 36 to rotate vertical pinion 37 with its gear 38, and gear 38 meshing with bull gear 39 rotates the turn-table 40 from which the drum 18 depends. Rotation of drum 18 with its rake arms and rakes causes settled sludge to be conveyed to the sludge discharge 15.

This arrangement of center pier, center drive for the sludge discharge mechanism also lends itself to the central siphonic feed to the clarifier. The feed from a suitable source of supply which is at a level above the liquid level in the clarifier flows through the siphon 25 up through the hollow central pier 20 and out therefrom through the slots 26, the height of the supply above the liquid level in the clarifier being sufficient to provide the necessary hydrostatic head. It will be recalled that the drum 18 revolves, so slots 27 are provided in it which, during its rotation, intermittently register with the slots 26 in the pier extension 45 in order that the feed from the slots 26 can pass through the drum into the clarifier through the slots 27. This arrangement is found to be doubly advantageous, in that the rotation of the drum has a helpful distributing effect upon the feed passing through the slots 27 therein. The fins or flanges 48 associated with the slots 27 in the drum 18 aid in diffusing the sewage flowing through the slots into the body of liquid in the clarifier. Where it is desired to feed siphonically to a group of clarifiers, this can be done by the arrangement shown in Figure 6 and described above.

From the foregoing it will be apparent that there is disclosed a sedimentation unit having a tank into which a liquid-solids mixture to be subjected to sedimentation or clarification is supplied by suitable influent feeding means provided, according to the example shown, by an inverted siphon having an upstanding delivery leg defined by the hollow portion 62 of the stationary central pier 20; that this tank is provided with a centrally located settled solids discharge or bottom discharge section 15 from which the settled solids are hydraulically withdrawn through the discharge pipe 16; and that it has a peripheral outlet 57 which is constructed so as to provide what has heretofore been termed the effluent launder and which may be referred to as a supernatant liquid overflow launder. The construction that provides this effluent launder is associated with the side or boundary wall 12 of the tank. The supernatant overflows past the baffle or weir 58 into the launder and therefrom through the outlet pipe 59.

It will also be noted that the tank has operatively associated therewith that which may be collectively called or termed a motivating arrangement or mechanism which may be considered as comprising as component parts thereof the motor 28, a power transmitting means provided as by spur gear 38, a driving connection including speed reducing means, to wit, a train of mechanism that includes parts such as the speed reducer 29, a belt or chain 31, the worm or screw 35, the horizontal worm driven gear 36, and the vertically extending shaft which carries and drives the power transmitting means provided by gear 38 (which said driving connection just mentioned is located between said motor and said power transmitting means and imparts power from the motor to said transmitting means), an ultimate power receiving means provided as by a bull ring or gear 39 that is coactively arranged with respect to the power transmitting means, a rotatable turntable provided by the member 40, a fixed support or base provided for the latter by the framework or turntable base 45, and the upstanding stationary pier or column 20 which extends upwardly from the tank bottom and from or by which said turntable base is supported.

It also will be apparent that the sedimentation apparatus or unit has a rotatable solids impelling arrangement or device drivable by means of the motivating arrangement or mechanism referred to and which is provided for raking settled solids from diverse sections of the tank bottom into the discharge section 15; that said rotatable impelling arrangement or device has or is constituted by rake arms 17 carrying raking blades 14 collectively constituting solids raking arms, a pier-encircling cage 18 which with equal propriety might be referred to as a drum, shell, sleeve, or structural frame and is therefore to be broadly construed, and which is supported from and rotatable with the turntable 40. The solids raking arms may be referred to as solids raking elements and they are carried by and are rotatably driven so as to turn or travel about the pier solely through the medium of said depending cage.

It will be also noted that the motor 28 and the driving connection heretofore referred to are mounted on constituent parts of the motivating arrangement and that the construction is such that the power required for rotating the solids raking arms about the pier and for moving the same against the load of settled solids to be impelled or raked thereby creates or results in a torsional reaction that is entirely absorbed or resisted by the pier.

It will be also noted that according to one aspect of the invention the sedimentation unit may be viewed as having an assemblage or mechanism that includes the stationary pier 20, solids raking elements provided as by the rake arms 17 and blades 14 carried thereby, the motor 28, and the mechanical train actuated by the motor and employed in effecting a rotating or turning movement of the raking elements about the pier. Such assemblage may be collectively referred to as a settled solids impelling assemblage and all parts thereof, excepting the pier, are supported so that the entire load thereof is directly or ultimately carried by the pier. It will also be noted that such assemblage as that just referred to includes motor operated mechanism such as is provided by the motor 28 and the several mechanical elements of the gear train or mechanism operated by the motor, and that such motor operated mechanism is disposed between and operatively related to the stationary pier 20 as the ultimate member on the one hand and the raking elements that collectively constitute another ultimate member on the other hand. It will be also observed that the operating of said motor 28 imparts to the solids raking element turning forces or turning moments of a character to effect the required moving of the raking elements and to effect an impelling action of said elements on the settled solids engaged thereby and that the reactive effects or, as otherwise expressed, the reaction resulting from the exertion of the power of said motor on the raking elements, is entirely resisted and entirely absorbed by the pier which takes up or absorbs the entire reactive torque load imparted to the pier.

It will thus be seen that the invention provides a neat and compact arrangement for driving the sludge discharge mechanism of a thickener, clarifier or digester in a manner that is cheap to build, is attractive in appearance and is practically fool-proof. The embodiment described is shown in an illustrative sense for the purpose of showing in what manner the invention may be carried out and not in a limiting sense for obviously many modifications may be made in the embodiment shown herein without departing from the spirit and scope of the appended claims.

I claim:

1. A sedimentation apparatus comprising a tank having a bottom, a boundary wall upstanding therefrom and a stationary pier upstanding from said bottom; a discharge conduit leading from a settled solids receiving section within the lower interior portion of the tank; feeding means for delivering influent solids-liquid mixture into one portion of the sedimentation zone within the tank; an effluent liquid withdrawal means by which supernatant liquid is withdrawn from the upper interior thereof spaced from the locality in which the influent is initially fed; and motor actuated travelling bladed elements for raking settled solids from diverse sections of the bottom of the tank to the settled solids receiving section from which it is discharged by said discharge conduit comprising a frame-work arrangement forming an extension of said pier and mounted thereupon, a cage rotatably depending from said framework and carrying said bladed raking elements, a motor, and a driving connection between said motor and said cage; said framework supporting said motor, said driving connection and said case.

2. Sedimentation apparatus having a tank with a sludge discharge, sludge discharging rakes; and means for operating said rakes comprising a pier, a framework arrangement thereon, a drum carrying said rakes rotatably depending from said framework, a motor, a worm gear driven thereby, a gear driven by said worm gear, a vertical pinion secured to said gear passing through said framework, a gear thereon below said framework, and a bull gear on said drum below said framework with which meshes said gear on said pinion below said framework.

3. Sedimentation apparatus having a tank with a sludge discharge, rakes for impelling settled sludge to discharge, a central feeding means for said tank comprising a hollow pier, a hollow extension thereon coacting therewith to constitute a delivery section through which the feed passes, rotatable means for supporting and turning said rakes comprising a dependably supported rotatable cage from the lower end portion of which the rakes are carried, a motor for providing power for turning the cage, and speed reducing and power transmission mechanism between said motor and said cage; said motor, said mechanism and said cage being supported by said hollow extension.

4. A sedimentation unit comprising a tank adapted to receive and to hold a liquid solids mixture undergoing sedimentation having a boundary wall, a bottom with a settled solids discharge section, an upstanding stationary pier, and a stationary structure constructed and arranged to form a turntable-base, said structure extending from and deriving its entire support from said pier; a turntable structure mounted on said base; a settled solids impelling assemblage having as one component element thereof solids raking arms functioning incident to a turning thereof to cause a transfer of settled solids from diverse portions of the bottom into said settled solids discharge section and as another component element thereof means depending from said turntable structure serving as a supporting medium for said arms; and an associated motor and power transmission means mounted on one of said structures and functioning to effect the turning of said settled solids impelling assemblage whereby the entire reaction of the torque load required for turning said arms is ultimately entirely absorbed by and through the medium of said pier.

5. A sedimentation tank having a hollow center pier through which liquid is discharged into the tank, a driven rotatable drum encircling said pier, sludge raking devices associated with said drum, and means for distributing liquid discharging from said pier comprising slots in said drum.

6. A sedimentation tank having a hollow center pier through which liquid is discharged into the tank, a driven rotatable drum encircling said pier, sludge raking devices associated with said drum, and means for distributing liquid discharging from said pier comprising slots in said drum and fins extending substantially radially from said drum.

7. A sedimentation tank having a hollow center pier through which liquid is fed to the tank, a slotted extension on said pier through which liquid is discharged from the pier into the tank, a driven rotatable drum encircling said pier, sludge raking devices associated with said drum, and means for passing radially through said drum liquid discharging from said slotted extension.

CHARLES H. SCOTT.